United States Patent
Rees et al.

(10) Patent No.: US 6,833,808 B2
(45) Date of Patent: Dec. 21, 2004

(54) SIGNAL PROCESSING

(75) Inventors: Huw D Rees, Malvern (GB); William N Dawber, Fareham (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 10/343,946

(22) PCT Filed: Aug. 3, 2001

(86) PCT No.: PCT/GB01/03507

§ 371 (c)(1), (2), (4) Date: Feb. 5, 2003

(87) PCT Pub. No.: WO02/14903

PCT Pub. Date: Feb. 21, 2002

(65) Prior Publication Data

US 2004/0046689 A1 Mar. 11, 2004

(30) Foreign Application Priority Data

Aug. 12, 2000 (GB) .............................. 0019825

(51) Int. Cl.⁷ .............................................. G01S 13/52
(52) U.S. Cl. .................. 342/159; 342/160; 342/161; 342/162; 342/195
(58) Field of Search ............................ 342/90, 95, 104, 342/110, 136, 159–162, 195

(56) References Cited

U.S. PATENT DOCUMENTS

| 4,040,055 A | | 8/1977 | Donahue et al. |
|---|---|---|---|
| 4,093,949 A | | 6/1978 | Evans |
| 4,137,533 A | | 1/1979 | Briechle et al. |
| 4,249,179 A | * | 2/1981 | Kolacny ..................... 342/102 |
| 4,394,658 A | | 7/1983 | Short, III |
| 4,626,856 A | | 12/1986 | Pierson et al. |
| 4,635,060 A | | 1/1987 | Mertens |
| 4,698,634 A | | 10/1987 | Alongi et al. |
| 4,891,649 A | | 1/1990 | Labaar et al. |
| 5,559,518 A | * | 9/1996 | DiDomizio ................. 342/174 |
| 5,732,111 A | * | 3/1998 | Walley ........................ 375/344 |
| 5,818,383 A | * | 10/1998 | Stockburger et al. ....... 342/109 |
| 6,037,892 A | * | 3/2000 | Nikias et al. ................. 342/25 |
| 6,081,228 A | | 6/2000 | Leimer |

FOREIGN PATENT DOCUMENTS

| GB | 0 153 130 | 8/1985 |
|---|---|---|
| GB | 2 212 686 | 7/1989 |

OTHER PUBLICATIONS

*Radar Handbook, MTI Radar*, pp. 15.44–15.55.

* cited by examiner

*Primary Examiner*—John B. Sotomayor
*Assistant Examiner*—Isam Alsomiri
(74) *Attorney, Agent, or Firm*—Nixon & Vanderhye P.C.

(57) ABSTRACT

A method and apparatus for processing of a signal in which a variation in phase between a transmitted and reflected pulse is modeled, as is the amplitude of the pulse. The modeled phase and amplitude are used to smooth the data by reducing phase noise present on the signal thereby enhancing the signal to noise ratio.

13 Claims, 4 Drawing Sheets

$\underline{e}$ is error vector $\alpha\ \delta\theta$
$\alpha\ X$

SIGNAL PROCESSING

This application is the U.S. national phase of international application PCT/GB01/03507, filed in English on Aug. 3, 2001 which designated the U.S. PCT/GB01/03507 claims priority to GB Application No. 0019825.9. The entire contents of these applications are incorporated herein by reference.

BACKGROUND OF THE INVENTION

This invention relates to a method and apparatus for signal processing. More particularly, but not exclusively it relates to a method and apparatus for digital signal processing where the signal is, typically, a radar signal.

Current maritime and aviation radar systems operate on the principal of outputting a train of radio frequency pulses in a given field of view, typically 8–16 pulses with an angular spread of 3–4°, and receiving the beam returned from a target, typically a ship or an aircraft, waves or the littoral environment. The delay of a returned pulse from the time of transmission is a measure of the distance of the object from the transmitting ship.

Doppler radar is a form of radar where an output signal is modulated onto a higher 'carrier' frequency local oscillator (LO) signal, the output signal frequency typically being around 5 MHz and the LO signal frequency around 3 GHz. The returned signal is demodulated by decoupling the LO frequency therefrom.

The amplitude and phase angle rotation rate of the demodulated reflected signal at a given distance, range cell, are respectively indicative of the radar cross-section of the target and also the relative radial velocity of the target with respect to the transmitting ship. For example, if an object is stationary all of the returned pulses will have the same amplitude and phase angle in the range cell containing the object and subtraction of successive returned pulses will return a near zero value for this range cell. The returns from these stationary objects are known as clutter and are particularly prevalent in littoral regions. A typical system has a moving target indicator cancellation figure, i.e. the noise level after two pulses are subtracted from each other, of −60 dB.

However, if the object is moving with a radial component of velocity relative to the transmitter, the phase of the reflected pulses (emitted at different times) within a range cell will vary, the rate of change of the phase between pulses being equal to the Doppler frequency of the object. Thus, the distance, and relative velocity of the object can be ascertained.

However, the LO does not produce an idealised, pure, single frequency. The LO will typically produce a generally symmetric distribution of frequencies about the central frequency which decrease monotonically away from the central frequency (for example, in the case of a local oscillator with a −20 dB point at 1 kHz, a target with 1 kHz Doppler shift relative to stationary clutter must have a reflected intensity (radar cross-section) greater than 1% of the centre peak, clutter, intensity in order to be detected). The spread of the frequency distribution is dependent upon the type and quality of LO used.

The LO also has instabilities associated with it which introduce phase noise into the transmitted pulses, a typical oscillator has a correlation time of approximately 50s. There is a drift in the LO frequency between the transmission and reception of a pulse which can give the impression that clutter is moving.

Where the LO phase drift at successive times is cumulative rather than simply random, it will be nearly constant for a few successive delays (i.e. through successive range bins) after a given transmitted pulse. The phase drift at the same delay after the next pulse will be different, but again it will vary very little over a few successive delays.

The clutter returns can be very large, for example a 3–4° width beam is 1 km wide 20 km from the transmitter and therefore "sees" a large amount of clutter. Target returns may be as low as $10^{-8}$ of the clutter returns.

Maritime radar require significant power outputs, typically in the kW to MW ranges, in order to obtain the desired detection range. This necessitates the amplification of the modulated signal. The amplifiers used are, for example travelling wave tubes (TWT), not very efficient at maintaining the signal frequency unchanged during amplification and this introduces a yet further phase drift between the LO output and the returned signal.

Use of very long coherent dwells with many pulses can provide a reduction in the processed phase noise, but this is not a practical option for an multifunctional radar (MFR) operating in surveillance, due to time budget limitations. Phase noise is therefore expected to be a key limitation to target detection in clutter.

Another important feature of some radars (e.g. airbourne, ground vehicle, or maritime) is that they are frequency agile. The ability to switch between transmitted frequencies can be important, for example where there are many ships in a flotilla and interference between radar transceivers is clearly undesirable. Frequency agility is also important for other reasons such as non-cooperative target recognition (NCTR), multipath detection arrangements and target reflection cross-section detectability (RCS).

The provision of frequency agility does however introduce phase noise into the system as it requires a versatile LO which can not be optimised over a broad range of frequencies as for good radar sensitivity virtually all circuits must be synchronised to the LO). Thus, the independence of the detected signal from the LO frequency can be established.

Mechanical vibrations introduce phase noise into the detected signal as they result in relative motion between the transmitter and the receiver. The cost of reducing phase noise by mechanical, or electronic hardware, means is very large and increases the price of low phase noise radar systems significantly.

SUMMARY OF THE INVENTION

It is an aim of some embodiments of the present invention to provide a method of signal processing that reduces the phase noise present in processed radar signals.

It is a further aim of the present invention to provide a method of signal processing that ameliorates at least one of the above problems.

It is still further aim of the present invention to provide signal processing means that reduce the phase noise present in processed radar signals.

It is a yet further aim of the present invention to provide signal processing means that ameliorate at least one of the above problems.

U.S. Pat. No. 4,137,533 discloses a method of discriminating a target radar signal from background clutter.

It will be appreciated in principle, and scope of protection sought, that any reference made herein to 'radar' encompasses electromagnetic radiation of any frequency and that any reference made herein to geographically distinct transmitters and receivers does not necessarily relate to a large separation, e.g. km, it can relate to only a few metres.

It will be appreciated that any reference herein to phase drift or phase noise relates to any variation in phase due to instabilities, electronic or physical, within the radar system.

According to a first aspect of the present invention there is provided a method of discriminating a time variable target radar signal from a background including the steps of:

I) acquiring range variable returns from a series of radar pulses having variable amplitude and phase;

II) sampling the returns to produce a set of ranged signals attributable to a set of range cells, the ranged signals having variable amplitude and phase for each range cell;

characterised by the steps of:

III) obtaining an estimate of the variation in phase drift between the transmission and reception of the ranged signals for each range cell;

IV) producing a smooth function representative of the variation in phase of the ranged signals between nearby (e.g. successive) range cells in each of the returns;

V) modifying the acquired range variable returns with respect to the function representative of the variation in phase between nearby range cells in order to obtain a corrected value for the amplitude and phase of each return signal;

VI) operating on the corrected set of range variable returns so as to identify an object having a relative velocity with respect to a receiver in a range cell.

Preferably the variation in phase between successive range cells in a specified return is obtained via a method including the steps of:

a) producing a smooth function representative of the amplitude and phase of the return signals in each specific range cell in successive returns;

b) modifying the amplitude and phase in each range cell to the corresponding amplitude value of the function for every range cell and pulse;

c) obtaining the phase drift of the (LO) from the modified signal.

The amplitude and phase of the signal may be represented in a complex form having an amplitude and an argument.

Preferably step IV) of the invention is carried out by successively averaging the phase variation in range cells adjacent successive range cells. Alternatively step IV) of the invention may be carried out by fitting the inter range cell phase variation to be a polynomial function, preferably a low order polynomial (e.g. zero, first, second, or third order).

Advantageously in step VI) of the first aspect of the present invention the transformation of the smooth function from phase space to frequency space is carried out by application of a Fourier Transforms (FT) to the smooth function. More advantageously the FT is a Fast Fourier Transform (FFT).

The amplitude of a given range cell may be ignored in step a) if it is below a threshold value. This is in order to overcome amplitude and phase variations being dominated by thermal noise. The smooth function in step (a) may be a low order polynomial.

In step c) the phasedrift of the LO may be obtained by measuring the argument of the modified signal.

Preferably the radar is a maritime radar. The radar may be multistatic radar, i.e. a transmitter and a receiver may not be in the same place. The transmitter may be a transmitter of opportunity. The method may obviate the necessity for a local oscillator at the receiver. The transmitter, a satellite or alternatively it can be a television transmitter. (the radar signal may be bounced off a satellite, covering the satellite to be an effective transmitter).

The variation in phase will be termed phase noise. Preferably the phase noise is due, at least in part, to clutter. Alternatively, or additionally, the phase noise may be due, at least in part, to effects due to the bandwidth of a local oscillator and/or drift in the local oscillator frequency. The local oscillator may be a voltage controlled oscillator. Alternatively, it may be a phase locked oscillator or a synthesiser, for example a direct digital synthesiser (DDS). As a further alternative, or addition, the phase noise may be due, at least in part, to a drift in frequency introduced by an amplifier or may be due at least in part to relative motion between the transmitter and the receiver, for example mechanical vibration.

The pulses may be compressed. The pulses may be digitally compressed. The pulses may be compressed by 'chirping'. Alternatively, the radar signal may be a frequency modulated continuous wave (FMCW).

The pulses may have a carrier frequency in the GHz range, for example a carrier frequency of 3 GHz, 5 GHz, 10 GHz, 20 GHz, or 60–70 GHz. The carrier may be generated by a frequency agile local oscillator. The carrier may be a signal with a frequency in the MHz range modulated onto it, for example a 5 MHz, 10 MHz or 15 MHz signal.

The relative velocity between the receiver and object may be represented by a frequency. This frequency may be a Doppler Frequency.

Preferably the target signal to noise+clutter ratio is about −70 dB. More preferably it is about −80 dB, or over about −90 dB. The target signal to noise+clutter relates to subclutter visibility of targets.

According to a second aspect of the present invention there is provided apparatus for discriminating a target time variable radar signal from a background, the apparatus including, a receiver and signal processing means, a transmitter transmits a series of pulses, the receiver being adapted to receive at least a portion of the pulses returned from a target and clutter, the receiver passing the returned portion of the pulse to the signal processing means, the signal processing means being adapted to reduce the phase noise present on the signal and thereby enhance the visibility of the target, in use.

Preferably the signal processing means is a digital signal processing means. The digital signal processing means may be in the form of hardware or alternatively it may be in the form of software stored on a computer readable medium. Preferably the transmitter is located near to the receiver.

According a further aspect of the present invention there is provided a method of signal processing including the steps of:

I) acquiring a plurality of datasets having first and second characteristic variables;

II) sampling each of the datasets to provide a plurality of series of data points having first and second characteristic variables;

III) fitting a smooth polynomial function to a variation of the first characteristic variable between successive data points;

IV) transforming the smooth polynomial function in the first characteristic variable to a third characteristic variable of the dataset.

Preferably the variation of the first characteristic variable is obtained by fitting a smooth polynomial function to the second characteristic variable at individual data points, between successive datasets and normalising each the individual data points in each dataset with respect to the smooth polynomial function.

Preferably the signal to be processed is a radar signal. The datasets may be return signals from a series of output radar pulses. The first characteristic variable may be the phase of the signal and the second characteristic variable may be the amplitude of the signal. The data points may be indicative of distance from a receiving station, these data points can be termed range cells.

The third characteristic variable may be a frequency. This frequency may be characteristic of a property of an object, such as its relative radial velocity, for example a Doppler frequency.

Preferably the amplitude in a given dataset is ignored if it is below a threshold value.

A method of reducing phase noise in radar comprising using radar returns (e.g. from clutter) in range bins that are nearby to each other to form an estimate of the phase draft between the local oscillator of the receiver and the transmitter pulse; and using that estimate of the phase drift to assist in increasing the differentiation between clutter returns and target returns.

Preferably the returns from adjacent range bins are used to establish an estimated phase drift.

Preferably the received, detected, radar returns are processed using the estimated phase drift and the processed values high pass filtered to pass only returns which have a greater phase change than the filter threshold value.

Preferably the phase drift for returns in a given range bin used in the modelling and/or used as the putative target return is not a single measured phase drift for that return, but is instead a value that has been modified by the art of an averaged or modelled phase drift derived from a plurality of pulses in that range bins.

The averaging/modelling of phase drift, within a range bin but across different radar pulse returns, gives a more accurate average phase drift that is related to the clutter return in that range bin.

A method of compensating for phase noise in a radar comprising detecting a plurality of radar pulse returns (1 to x) in each of a plurality of range cells (1 to n); each pulse return having a phase $\theta$ ($\theta, \ldots \theta_x$)n; establishing a relative phase difference ($\delta\theta_1\ \delta\theta_2\ \ldots\ \delta\theta_x$) for each of the plurality of radar returns (1 to x) in each individual range cell (1 to n), the phase difference ($\delta\theta_1\ \delta\theta_2\ \ldots\ \delta\theta_x$) being relative to a modelled value ($\theta_{mod1}, \theta_{mod\ 2}, \ldots \Theta_{mod\ x}$) applicable for each particular radar return (1 to x) in the range cell; establishing for each range cell (1 to n) an averaged phase difference ($\delta\theta_1\ \delta\theta_2 \ldots \delta\theta_n$) for the radar returns in that range cell, averaged over the pulses in that range cell; and evaluating the averaged phase differences for the range cells ($\delta\theta_1\ \delta\theta_2 \ldots \delta\theta_n$) to establish one or more anomalous $\delta\theta_{1\ to\ n}$, said anomalous $\delta\theta_{1\ to\ n}$ being indicative of a moving target.

Working within a given range cell there may be significant variations in the LO Frequency between successive pulses due to the large time delay therebetween. $\delta\theta$ due to L.O. phase noise will vary only slowly between successive range cells for a given pulse. Thus for $\delta\theta_{pulse\ number,\ range\ cell\ number}$ the variation from $\delta\theta_{1,1}$ to $\delta\theta_{1,2}$ is less than the variation from $\delta\theta_{1,1}$ to $\delta\theta_{2,1}$. Thus it is possible to model $\theta_{mod\ 1} \ldots \theta_{mod\ x}$ using a simple model (e.g. straight-line fit, polynomial regression fit etc). This allows us to obtain $\delta\theta_{1-x}$ for each range cell. If there is a significant change in $\delta\theta$ between adjacent range cells this is indicative of a moving target. It will be appreciated that the variation in $\delta\theta_{1-x}$ may contain an element due to the slow-speed movement of clutter.

Preferably detected phase difference signals ($\delta\theta_2 \ldots \delta\theta_n$) from a range cell n are divided by a modelled phase noise error signal for each pulse ($\delta\theta_{1\ modelled}\ \delta\theta_{1\ modelled} \ldots \delta\theta_{z\ modelled}$). Preferably the modelled phase noise error signals ($\delta\theta_{1modelled}\ \delta\theta_{1\ modelled} \ldots \delta\theta_{z\ modelled}$) are derived by predicting their value for signal x using the measured $\delta\theta$ from one or more adjacent range bins, preferably immediately adjacent range bins. For example the modelled phase noise error signal ($\delta\theta_{1modelled}\ \delta\theta_{1\ modelled} \ldots \delta\theta_{z\ modelled}$) for a range bin n are derived by averaging to $\delta\theta_{bin}$ n−1 and $\delta\theta_z$ n+1. If the bin n−1 or bin n+1 contains a target averaging their $\delta\theta$ to provide a contribution to $\delta\theta_{bin\ n,\ pulse\ x}$ will not be helpful. Instead we may "coast" over the anomalous signal, possible by assuming that $\delta\theta_{bin\ n}$ is the source as $\delta\theta_{bin\ n-1}$, or that it follows any detectable/predictable trend for $\delta\theta_{bin\ near\ n}$.

The invention, in at least one embodiment, resides at least in part in the realisation that clutter signal (slow moving) is smoothly varying from pulse to pulse—and so we can average/smooth the signals of a group of pulses (near in time to each other) and use the modelled/smoothed values as a base line from which to evaluate the change in phase of the different detected pulses in that group of pulses. Any large variation in change in phase—away from the smoothly varying predicted value—is likely to be indicative of a target.

Also at least part of an embodiment of the invention resides in the realisation that the phase noise from a local oscillator or amplifier is constant for a given pulse and since the phase noise varies slowly the phase change in the phase noise varies smoothly from range cell to range cell for a give pulse. Thus we can take, for a given pulse, a predicted, modelled, averaged or otherwise smoothed or best-fitted, value for the phase noise for that given pulse based on the phase noise from different nearby range cells.

Thus for a given pulse in a given range bin we can smooth phase noise by averaging/best-fitting detected phase difference to a line derived from the phase noise detected for that pulse in adjacent range cells. A close fit of the measured change of pulse predicted by smoothing (for each pulse separately) over nearby range cells is indicative that the detected phase noise for that pulse has no target contribution: wide derivation from the predicted value is indicative that there is a target in that range bin.

This invention describes a method of tracking the phase drift from sample to sample (range bin to range bin) and then recalculating the returns applying compensation to allow for this tracked, phase drift.

The PNR technique exploits clutter returns of opportunity to calculate the phase drifts between transmitter and receiver and then modify the outputs to account for these drifts. The method relies on the relative coherence of the phase drifts from range-cell to range-cell compared with those from pulse-to-pulse.

The technique uses radar returns from clutter in successive range bins to form an estimate of the phase drift between the local oscillator and the transmitted pulse. The phase drifts are typically highly correlated from one range cell to the next allowing a high pass filter to be used to reduce the phase noise.

The principle underlying the suggested, signal processing method is to use the near-constancy through successive range bins to estimate the actual phase shift and hence to correct for it. Since the essence of the approach is to estimate the phase deviation from the signal returns and apply correction, it can be classed as adaptive processing.

The predictive (non-white) part of local oscillator noise can be cancelled by adaptively processing the clutter returns in a succession of range bins.

BRIEF DESCRIPTION OF THE DRAWINGS

The invention will now be described, by way of example only with reference to the accompanying drawings in which.

DETAILED DESCRIPTION OF THE INVENTION

Figure 1:
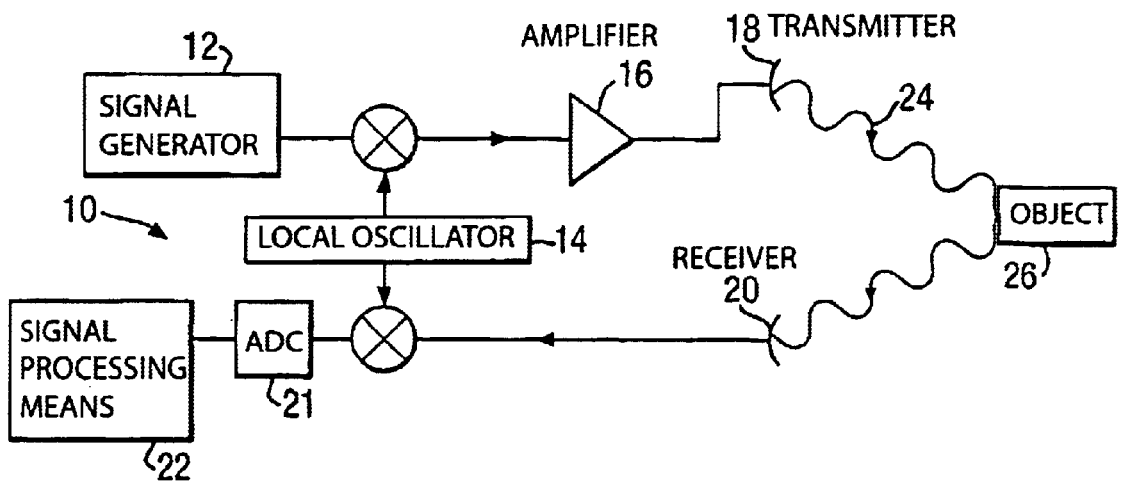
FIG. 1 is a schematic representation of a Doppler radar employing the signal processing method according to the present invention.

A Doppler radar system 10 includes a signal generator 12, a local oscillator 14, an amplifier 16, a transmitter 18, a receiver 20 an ADC 21 and signal processing means 22.

The signal generator 12 produces a pulsed output, typically a few MHz, this is modulated onto a carrier wave, typically a few GHz, which is generated by the local oscillator 14. The modulated train of pulses 25 are amplified by the amplifier 16 and output via the transmitter 18.

When a wavefront of a pulse 24 strikes an object 26 for example a boat or an aircraft, it is reflected to the receiver 20. The pulse 24 is demodulated decoupling the local oscillator signal from the reflected pulse 24 to produce a raw detected signal having a phase and an amplitude characteristic of the velocity and radar cross-section of the object respectively.

Figure 2:
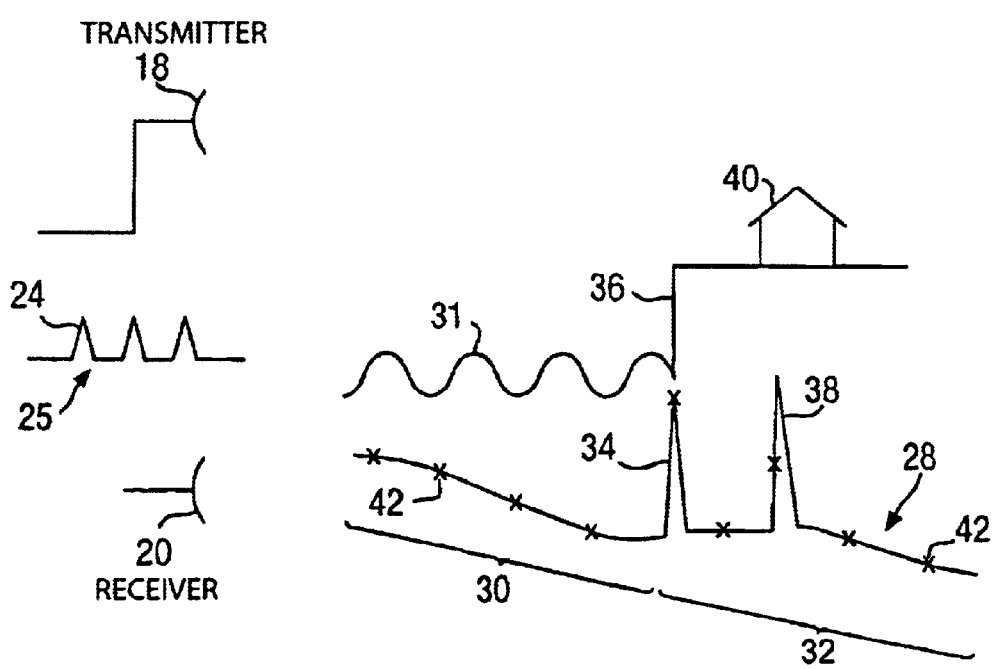
FIG. 2 is a schematic representation of a pulse return from a littoral environment, also shown schematically, derived from the radar of FIG. 1.

FIG. 2 shows a typical return 28 for the pulse 24 in a maritime littoral environment, there is a steadily decreasing first region 30 of the return due to scattering from the sea 31. The returned signal amplitude in the first region 30 decreases rapidly.

A second region 32 of the return 28 is due to the shore, and inland environment. A first peak 34 in the second region 32 is due to the pulse 24 reflecting from a cliff 36 and a second peak 38 is due to the pulse 24 reflecting from a building 40 behind the cliff 36.

The return 28 is sampled at regular intervals, the time delays corresponding directly to a distance from the receiver 20. The samples 42 are termed range cells.

Each sample forming a range cell 42 has an amplitude and a phase associated with it. The values of the amplitude and phase for each range cell are digitised using the ADC 21 and are then passed to the signal processing means 22. The amplitude and phase vary significantly between range cells depending upon the radar cross-section and velocity of the contents of each range cell, but only slightly between pulses 24 in any given train of pulses for an ideal system.

Figure 3:
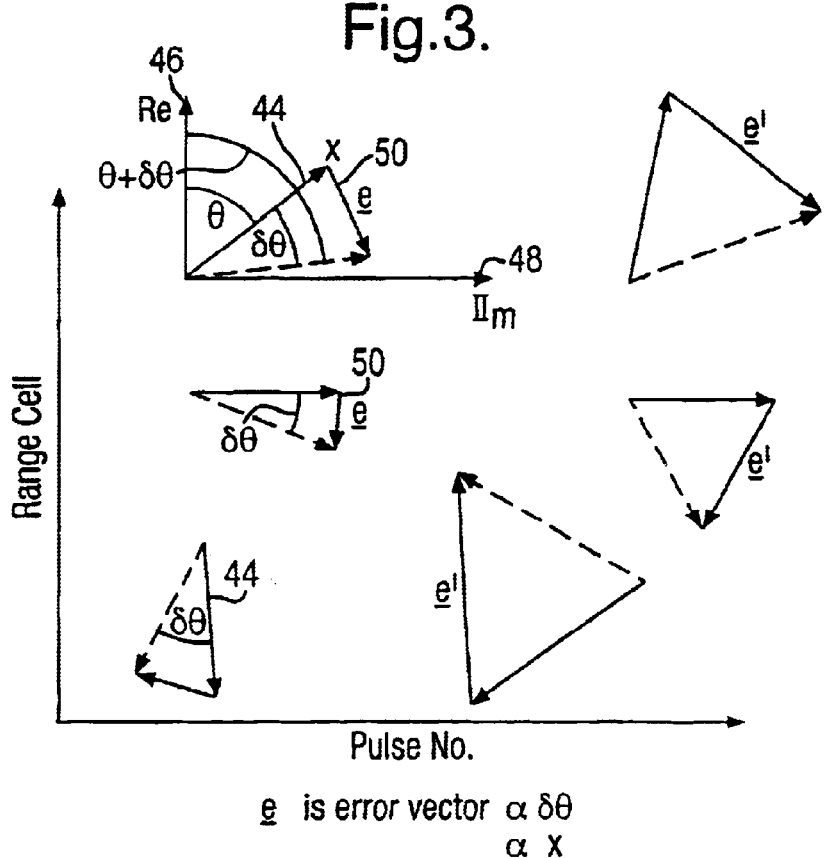
FIG. 3 is a diagram showing the variation of radar return due to phase drift with respect to range cell, Y axis, and pulse number, X axis.

The vector $Xe^{i\theta}$ 44 described by the amplitude (X) and phase ($\theta$) of each of the range cells 42 can be resolved into mutually orthogonal real 46 and imaginary components 48 by the signal processing means 22, as shown in FIG. 3.

Figure 4:
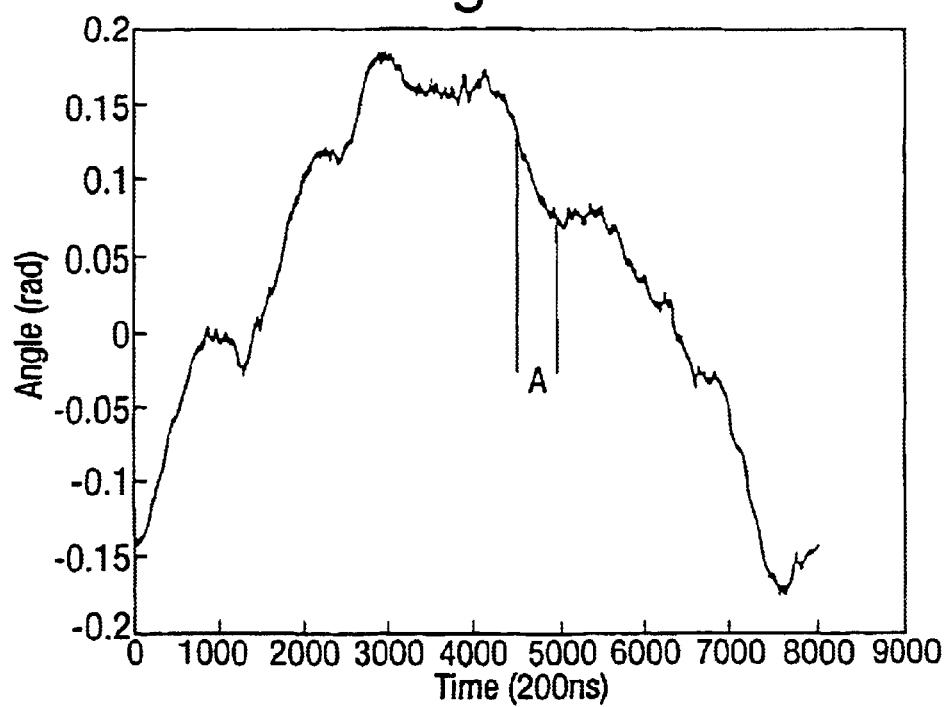
FIG. 4 is a phase angle sequence diagram of a simulation of a radar having a bandwidth of 10 MHz, and a pulse repetition interval of 0.1 ms.

However, frequency broadening of the output of the local oscillator 14, drift of the local oscillator output frequency between the transmission of the pulse 24 and the reception of the return 28, see for example FIG. 4, and drift of the output frequency due to amplifier 16 instabilities, contribute to produce a deviation from an ideal system. This deviation manifests itself by an error 50, e, is phase and amplitude for each detected signal return that is approximately proportional to the clutter power and the above mentioned phase drifts, such that the error 50 is given by $Xe^{i\delta\theta}$. The error 50 is approximately constant, slowly varying in magnitude between the range cells of a single pulse but varies significantly between different pulses 24 in the train of pulses 25, as shown in FIG. 3.

Figure 5:
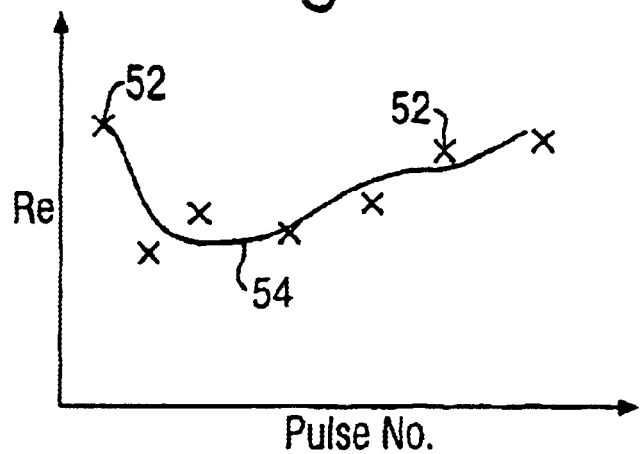
FIG. 5 is a representation of a polynomial fit to a real part of radar returns from a single range cell with respect to pulse number.

The signal processing means 22 sequentially takes a return 52 for every range cell 42 from each pulse 24 in the train of pulses 25 and produces a polynomial best fit estimate 54 ($X_{EST}$) for both the real 46 and the imaginary 48 part, typically the real part, see for example FIG. 5.

The returns are normalised with respect to the polynomial best fit estimate, value 54 for each individual range cell 42 in every return.

$$Xe^{i\delta\theta} \longrightarrow \frac{Xe^{i\delta\theta}}{X^{EST}} \longrightarrow Ae^{i\delta\theta}$$

(Where A is a quiescent scaling factor, which may be unity).

Figure 6:
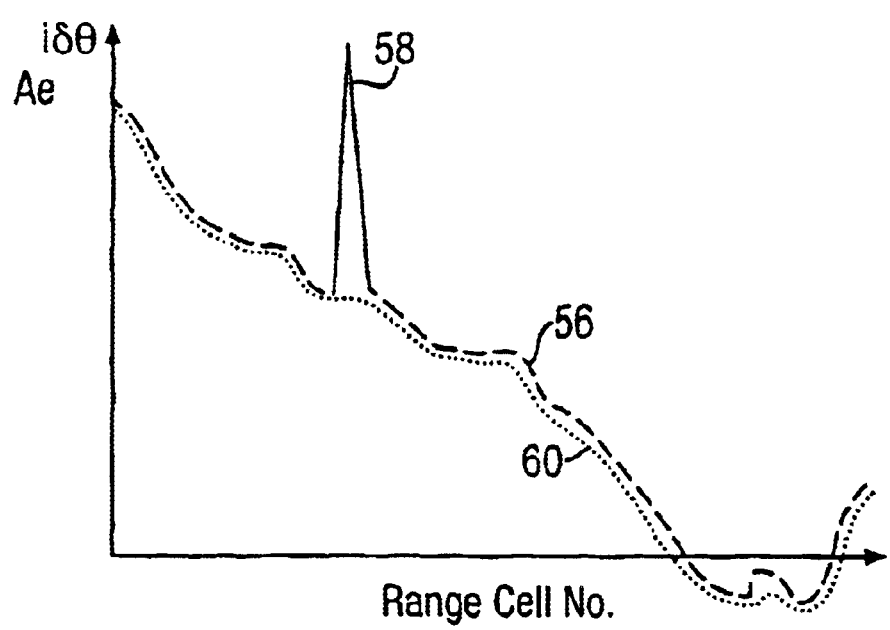
FIG. 6 is a representation of the variation of phase drift of a radar return with respect to range cell from a single pulse.

There is very little variation in $e^{i\delta\theta}$, typically 0.001 radians from FIG. 4, between adjacent range cells 42 within a pulse 24 as the time interval between range cells samples is very small, typically 200 ns. This assumes that there is not a fast moving object having a significant radar cross-section, for example $>-3$ $dBm^{-2}$, in the range cell, in which case $\delta\theta$ between adjacent range cells will be abnormally large. The variation between pulses in $e^{i\delta\theta}$ is typically 0.05 radians, see for example region A of FIG. 5. Thus, the variation of $Ae^{i\delta\theta}$ within a pulse 24 can be mapped as a slowly varying function as shown in FIG. 6.

A discontinuity, spike 58, in the plot of $Ae^{i\delta\theta}$ versus range cell is due to an object with a significant radar cross-section being present within that range cell and having a radial velocity relative to the receiver 20.

The smooth of $Ae^{i\delta\theta}$ with range cell can be estimated by the value 60 of a polynomial function or by the use of a three point shifting window averaging techniques or any other suitable estimating techniques or routine.

In the case where a polynomial function is used to estimate the variation of $Ae^{i\delta\theta}$ with range cells, the fitting procedure produces a slowly varying, smooth curve which cannot follow rapid variations, such as occur in the range cell containing the spike 58.

The three point shifting window averaging technique involves sequentially averaging the two range cells either side of the current range cell of interest. This technique can result the range cells adjacent the spike 58 being biased. Therefore three range cells will be affected by a moving target, all three will exhibit anomolous values of $Ae^{i\delta\theta}$ a which are detected during subsequent, standard, moving target indicator (MTI) processing.

The returns 28 are normalised, for every pulse in each range cell, with respect to an estimated value 60 of the phase variation, in order to produce a phase drift corrected return which has very little phase noise present.

$$Xe^{i\delta\theta} \longrightarrow \frac{Xe^{i\delta\theta}}{Ae^{i\delta\theta EST}} \longrightarrow X^1$$

The signal processing means 22 sequentially takes the corrected returns for every range cell 42 from each pulse 28 and produces a polynomial best fit estimate $X^1_{EST}$.

The best fit estimate is subtracted from corrected data for each return. This results in a residual Q, for each range cell.

$$X^1 - X^1_{EST} = Q$$

The residuals are filtered by the signal processing means 22 using a high pass filter which can be a simple threshold filter, a moving target indicator (MTI) filter or a polynomial clutter suppression (PCS) technique.

In range cells having no target moving with a radial velocity relative to the receiver the residual will be near zero, low frequency, and in range cells containing a moving target the residual will be significant, high frequency, assuming substantially constant noise level.

The filtered returns are transformed, typically using a convolution integral, into frequency space. The transform has an amplitude representative of the radar cross-section of an object in a given range cell and a frequency (Doppler bin) corresponding to the Doppler frequency of the object with respect to the receiver.

Figure 7:
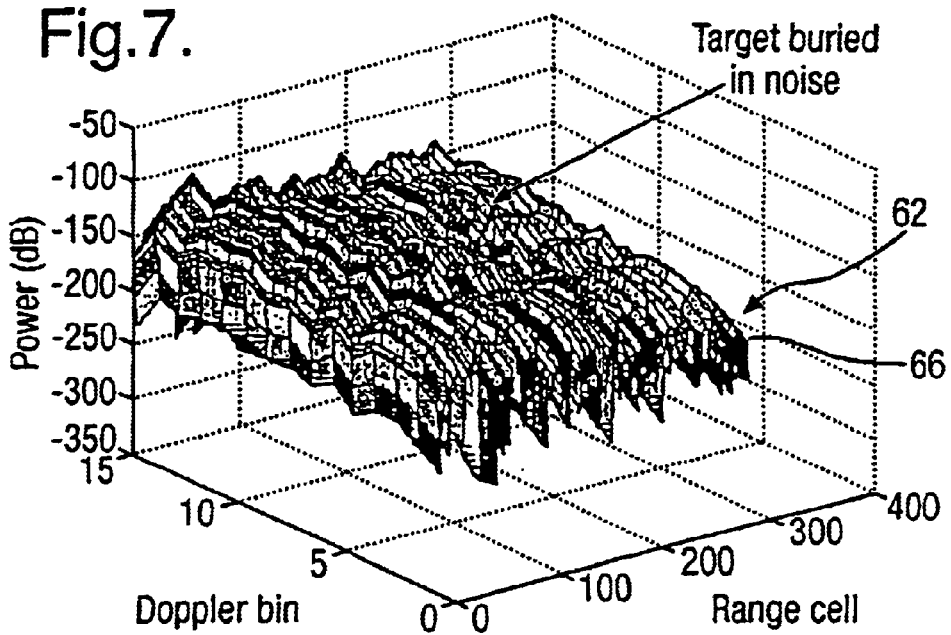
FIG. 7 is a simulated radar return having a target below the noise level prior to application of the signal processing method according to the present invention.
Figure 8:
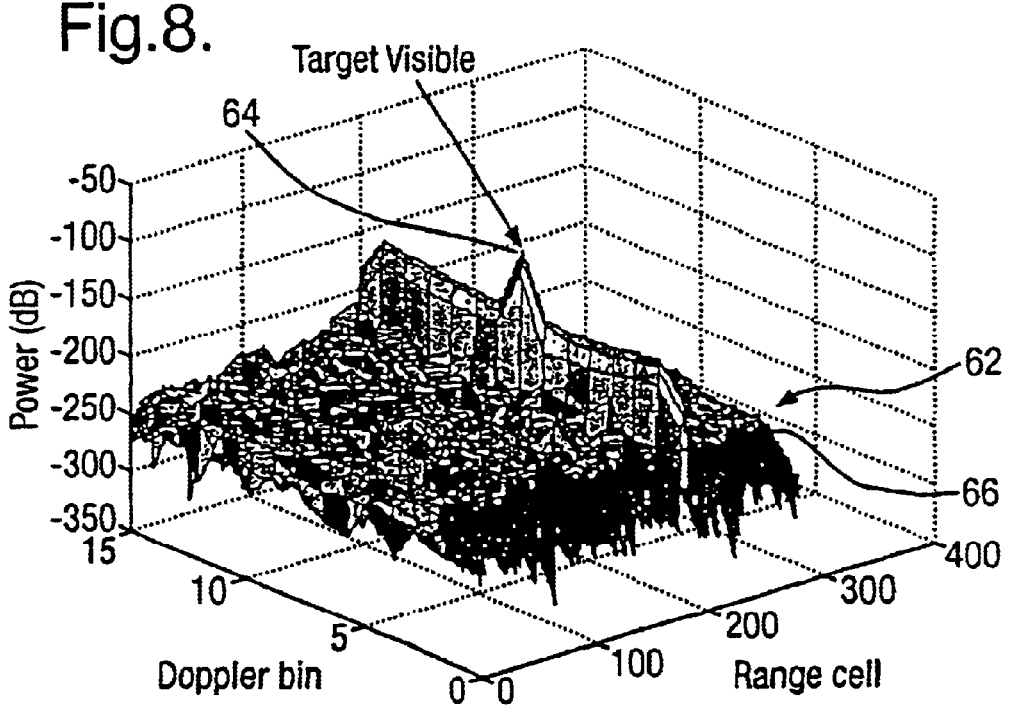
FIG. 8 is the simulated radar return of FIG. 6 after application of the signal processing method according to the present invention.

FIGS. 7 and 8 show a simulated radar return 62 having a 'target' 64 in the $200^{th}$ range cell, before and after the application of phase noise reduction (PNR) respectively. PNR has reduced base noise level 66 by approximately 35 dB thereby enhancing the visibility of the signal due to the target 64.

Simulations show that phase noise reduction improvement factors of between 8 and 40 dB are possible with the degree of improvement being strongly dependent on the large diffusive component of the noise produces phase deviations that are almost constant over several range bins. Initial simulations of the adaptive phase noise cancellation method have demonstrated how adaptively cancelling the oscillator noise can significantly improve the visibility of targets in clutter.

The above-mentioned method assumes that there is no additional, non-system, noise present on the returned signal. However, there will always be thermal noise present on the signal which will introduce random amplitudes and phase variations.

In the case of weak clutter, the phase of the returns from the clutter can be of the same order as the local oscillator phase error and the random thermal noise can become dominant. In order to overcome this effect the data processing unit 22 interpolates over a range cell if the returned amplitude in that range cell is below a threshold value.

The use of pulse compression allows a large total output power to be achieved with a low peak power output by the modulation of a frequency chirp onto a long pulse and the use of a matched convolution filter to compress the pulse down upon reception.

Pulse compression reduces phase drift due to high peak power switching instabilities in the amplifiers and solid state circuitry. However, the use of pulse compression does require the LO drift over the lifetime of the transmitted expanded pulse to be compensated for, and this is achieved by the use of an adaptive technique, see for example the equation in Appendix A to the present application.

The method takes raw compressed complex data, $S_{n,m}$ from the radar and forms an estimate, the normalised output $N_{n,m}$ of the phase error for each pulse in each range bin. This initial estimate is corrupted in range cells where there are targets, which appear as discontinuities when the slowly varying phase noise, a tracking filter, $F_{n,m}$ is formed from the initial estimate by applying a range averaged background average to the normalised output. In range cells where the clutter-to-noise ratio is insufficient for a good estimate of the phase drift to be made, the tracking filter is 'coasted', maintaining the value from the last range cell where a good estimate was made. The phase noise corrected date, $C_{n,m}$ is then computed from the tracking filter by applying the equation $$Cn, m = \frac{Sn, m}{Fn, m}$$

As well as accounting for phase noise the method also compensates for amplitude variations in the transmitter pulse which are slow compared with the instantaneous bandwidth of the radar. Negligible phase drift during the period of the expanded, transmitted pulse and would therefore be expected to give reduced performance in radar utilising high pulse compression ratios.

In a multistatic radar system the transmitter and receiver systems are separated by a significant distance, for example a few km and share no common reference oscillator, i.e. the local oscillator. Using the present invention of noise reduction it is possible to generate a synthetic local oscillator at the receiver as there are a large number of returns, for example due to clutter, which are of no interest for targeting purposes but may be used as reference clock signals from which $\delta\theta$ may be derived. This allows oscillators of opportunity such as television signals or satellites to be used as sources for moving target indicators.

It is envisaged that this method of phase noise reduction could be applied to car collision avoidance systems, for example where FM continuous wave radio signals, is the 60–70 GHz range, are used. These systems have a power requirement due to strong atmosphere absorption in this region and the power sources are a major cost. The present invention could reduce the power requirements in collision avoidance systems by reducing the base noise level and thereby improving the signal to noise radiation. Reducing the power of the radar will reduce the E.M. interference caused by the radar with other systems/generally reduce E.M. pollution.

Many small craft, such as yachts, use radar systems which are not coherent and are merely amplitude dependent. This gives rise to problems in rough seas where returns from waves are large. It is envisaged that the method of the present invention can be employed to improve the performance of such systems.

Appendix—Detailed Description of the Algorithm

Consider a radar using pulse compression which transmits an expanded pulse of duration T. The transmitter modulation is denoted by h(t') and extends over the period 0<t'<T. The modulation is imposed on a carrier and a transmitted pulse is represented by $$f(t') = h(t')e^{-i\Omega t' + i\Phi(t')}$$

where $\Omega$ is the carrier frequency and $\Phi(t')$ is the phase deviation of the carrier. Where $\Phi(t')$ is complex then amplitude drift is represented by the complex part.

The returned signal is mixed down to baseband which has the effect of removing the carrier, $e^{-i\Omega t'}$.

The received un-compressed signal is then given by $$s(t) = \int_0^T h(t')\alpha(t',t)e^{i(\Phi(t')-\Theta(t))}dt'$$

where a(t',t) is the (complex) return from clutter and targets and θ(t) is the receiver phase deviation at time t.

If Φ(t') remains approximately constant over the expanded pulse length 0<t'<T then we have $$s(t) \approx e^{i(\Phi(0)-\Theta(t))}\int_0^T h(t')\alpha(t',t)dt'$$

where we have assumed Φ(t')=Φ(0) for 0<t'<T

A pulse compression filter is given by g(t) and the pulse compressed output is given by $$S(\tau) = \int_\tau^{\tau+T} g(t-\tau)s(t)dt$$

$$S(\tau) = \int_\tau^{\tau+T} g(t-\tau)\int_0^T h(t')\alpha(t',t)e^{i(\Phi(0)-\Theta(t))}dt'dt$$

Further, if we assume the phase drift of the receiver local oscillator remains approximately constant over the un-compressed pulses length so that θ(t)=θ(τ) for τ<t<τ+T then we have $$S(\tau) = e^{i(\Phi(0)-\Theta(\tau))}\int_\tau^{\tau+T} g(t-\tau)\int_0^T h(t')\alpha(t',t)dt'dt$$

We can re-write this as $$S(\tau)=e^{i(\Phi(0)-\Theta(\tau))}X(\tau)$$

where X(τ) is the ideal compressed signal that would have been obtained in the absence of phase noise.

Now consider a coherent burst of pulses. For the nth pulse in the mth range bin we can write $$S_{n,m}=e^{i(\Phi_{n,0}-\Theta_{n,m})}X_{n,m}$$

We will write $$X_{n,m}=X_{LFn,m}+X_{HFn,m}$$

Where $X_{LFn,m}$ is low frequency component of the ideal returns (the clutter)

And $X_{HFn,m}$ is the high frequency component of the ideal returns (the targets)

Now, in the absence of targets, $X_{n,m}$ will be due to slow moving clutter. In a given range cell the variation of $X_{n,m}$ from pulse to pulse will be slowly varying and can be well approximated by a low order polynomial fit. The order of the fit is chosen to match the expected clutter bandwidth, for instance for an 8 pulse dwell at 10 kHz PRF at E/F band a $3^{rd}$ order fit appears to be near optimal for sea and land clutter. When a polynomial fit is applied to clutter data with phase noise then it will fit to the slow moving clutter and the slowly varying component of the phase noise in that range cell, but not to the fast varying phase noise. We have approximately $$P_{n,m}=X_{LFn,m}e^{i(\Phi_{n,0}-\Theta_{n,m})_{LF}}$$

Where $(\Phi_{n,0}-\Theta_{n,m})_{LF}$ is the low frequency component of phase difference in the $m^{th}$ range cell.

The phase angular errors due to the local oscillator/transmitter drift with range can now be estimated from the raw data by normalising with respect to the polynomial fit in each range cell.

$$N_{n,m} = \frac{S_{n,m}}{P_{n,m}} = e^{i[(\Phi_{n,0}-\Theta_{n,m})-(\Phi_{n,0}-\Theta_{n,m})_{LF}]} + \frac{X_{HFn,m}e^{i(\Phi_{n,0}-\Theta_{n,m})_{HF}}}{P_{n,m}}$$

The first term is due to slow moving clutter and is an estimate of the phase noise error for high frequencies outside the polynomial fit bandwidth for that range cell. The second term is due to high frequency returns and should only be present in a small number of range cells where there are targets (or false alarms due to fast clutter).

We are interested in the first term in $N_{n,m}$, which provides an estimate of the phase drift. In order to avoid correcting for targets (the second term), we form a background, range averaged filter, $F_{n,m}$, which takes on the value of the local mean for the normalised output, $N_{n,m}$, but does not include the range cell under evaluation.

$$F_{n,m} = \frac{N_{n,m-1}+N_{n,m+1}}{2}$$

The phase noise corrected data is then given by $$C_{n,m} = \frac{S_{n,m}}{F_{n,m}} \approx X_{n,m}e^{i(\Phi_{n,0}-\Theta_{n,m})_{LF}}$$

The corrected data $C_{n,m}$ is the ideal response with a residual phase term due to the low frequency component of the phase drift in each range cell. The residual term is unimportant, since it is removed by MTI (or PCS) filtering.

Clutter can now be removed by conventional MTI filtering or by applying the polynomial clutter suppression (PCS) technique. The residual phase term in the corrected data is just the low frequency component, which will be removed by the MTI filtering. The filter function $F_{n,m}$ has been chosen to follow the slow varying phase drift but will not follow a compressed target which will appear in just one (or possibly two) range cells and will thus not be cancelled by the process.

The preceding argument has ignored thermal noise, which will be a reasonable approximation where phase noise is the dominant source of noise, typically where the clutter returns are large, however where clutter returns are small thermal noise will dominate. In these cases the phase drifts will not be accurately predicted and so data from these range cells should not be included in the phase angle tracking. The range cells where phase noise will not dominate can be found by measuring the magnitude of the polynomial fit in each range cell. It this falls below a pre-determined threshold value then that range cell is not included in the phase tracking filter and a coasting rule is applied, working out in range, increasing m, we have If $F_{n,m+1}$<Threshold Then $$F_{n,m}=F_{n,m-1}$$

and $$F_{n,m+1}=F_{n,m}.$$

What is claimed is:

1. A method of discriminating a time variable target radar signal from a background including the steps of:
   I) acquiring range variable return signals from a series of radar pulses, the returns having variable amplitude and phases;
   II) sampling each of the returns to produce a set of ranged signals attributable to a set of range cells, the ranged signals having variable amplitude and phase for each range cell;

characterised by the steps of:
   III) obtaining an estimate for the variation in phase drift between the transmission and reception of the ranged signals for each range cell;
   IV) producing a smooth function representative of the variation in phase of the ranged signals between nearby range cells in each of the returns;
   V) modifying the acquired range variable returns with respect to the function representative of the variation in phase between nearby range cells in order to obtain a corrected value for the amplitude and phase of each return signal;
   VI) operating on the corrected set of range variable returns so as to identify an object having a relative velocity with respect to a receiver in a range cell.

2. A method of discriminating a time variable target radar signal from a background as claimed in claim 1 further comprising the steps of:
   a) producing a smooth function representative of the amplitude and phase of the return signals in each range cell in successive returns;
   b) modifying the amplitude and phase in each range cell to the corresponding amplitude value of the function for every range cell and pulse;
   c) obtaining the phase drift from the modified signal.

3. A method as claimed in either claim 1 wherein the relative velocity between a receiver and an object is represented as a Doppler frequency.

4. A method as claimed in any preceding claim 1 wherein the function of step (IV) is obtained by means of a polynomial curve fit to the calculated variation in phase variation between adjacent range cells.

5. A method as claimed is any one of claim 1 wherein the function of step (IV) is obtained by successively averaging the phase variation in range cell adjacent successive range cells.

6. A method as claimed in claim 1 wherein the radar signal is generated by a frequency agile transmitter.

7. A method as claimed in claim 1 wherein the radar pulses are transmitted by a transmitter at a first geographic location and received by a receiver at a second, geographically distinct location.

8. A method as claimed in claim 7 wherein the radar pulses are transmitted from a satellite.

9. A computer readable medium having a program recorded thereon in which the program causes, in use, a computer running the program to execute a procedure according to the method of claim 1.

10. An apparatus for discriminating a target time variable radar signal from a background including a receiver and signal processing means adapted to process the signal according to claim 1.

11. An apparatus for discriminating a target time variable radar signal from a background, the apparatus including, a receiver and signal processing means and a transmitter for transmitting a series of pulses, the receiver being adapted to receive at least a portion of the pulses returned from a target and clutter, the receiver passing the returned portion of the pulse to the signal processing means characterised in that the signal processing means is adapted in use to
   a) acquire range variable returns from a series of radar pulses having variable amplitude and phases;
   b) sample the returns to produce a set of ranged signals attributable to a set of range cells, the ranged signals having variable amplitude and phase for each range cell;
   c) obtain an estimate for the variation in phase drift between the transmission and reception of the ranged signals for each range cell;
   d) producing a smooth function representative of the variation in phase of the ranged signals between nearby range cells in each of the returns;
   e) modify the acquired range variable returns with respect to the function representative of the variation in phase between nearby range cells in order to obtain a corrected value for the amplitude and phase of each return signal, and;
   f) operate on the corrected set of range variable returns so as to identify an object having a relative velocity with respect to a receiver in a range cell.

12. An apparatus as claimed in claim 11 wherein the signal processing means is a digital signal processing means.

13. An apparatus as claimed in claim 11 wherein the signal processing means is one of 1) hardware, 2) software, 3) a combination of 1) and 2).

* * * * *